United States Patent
Jin et al.

(10) Patent No.: US 9,424,670 B1
(45) Date of Patent: Aug. 23, 2016

(54) INTERACTIVE THRESHOLD SETTING FOR PIE CHARTS

(71) Applicant: International Business Machines Corporation, Armonk, NY (US)

(72) Inventors: Ying Jin, Shanghai (CN); Jun Liao, Shanghai (CN); Ying Shao, Shanghai (CN); Gang Yin, Shanghai (CN); Jing Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/095,452

(22) Filed: Apr. 11, 2016

Related U.S. Application Data (63) Continuation of application No. 14/996,295, filed on Jan. 15, 2016.

(51) Int. Cl.
*G06T 11/20* (2006.01)
*G06F 3/0484* (2013.01)

(52) U.S. Cl.
CPC .......... *G06T 11/206* (2013.01); *G06F 3/04842* (2013.01)

(58) Field of Classification Search
CPC .. G06F 3/04842–3/0486; G06T 11/20–11/206
See application file for complete search history.

(56) References Cited

U.S. PATENT DOCUMENTS

| | | | |
|---|---|---|---|
| 7,583,266 B2 | 9/2009 | Ben-Tovim et al. | |
| 7,692,653 B1 * | 4/2010 | Petro | G06T 11/20 345/440 |
| 8,024,651 B1 | 9/2011 | Error | |
| 9,117,311 B2 | 8/2015 | Taylor et al. | |
| 9,142,046 B2 | 9/2015 | Jain et al. | |
| 2011/0007075 A1 * | 1/2011 | Lee | G06F 3/0482 345/440 |
| 2012/0324388 A1 | 12/2012 | Rao et al. | |
| 2014/0176555 A1 * | 6/2014 | Kuo | G06T 11/206 345/440 |
| 2015/0040052 A1 | 2/2015 | Noel et al. | |
| 2015/0248214 A1 * | 9/2015 | Gilger | G06F 3/04842 715/719 |

OTHER PUBLICATIONS

"Collect Small Slices on a Pie Chart (Report Builder and SSRS)", Microsoft Developer Network, MSDN Library, © 2015, 2 pages.
"Visualization: Pie Chart", Google Developers, printed Nov. 18, 2015, <https://developers.google.com/chart/interactive/docs/gallery/piechart?hl=en#slice-visibility-threshold>, 17 pages.
Jin et al., "Interactive Threshold Setting for Pie Charts", U.S. Appl. No. 14/996,295, filed Jan. 15, 2016, 33 pages.
IBM Appendix P, list of patents or patent applications treated as related, Apr. 22, 2016, 2 pages.

* cited by examiner

*Primary Examiner* — Charles Tseng
(74) *Attorney, Agent, or Firm* — Alessandra A. Suuberg (57) ABSTRACT

In an approach to threshold setting for pie charts, a computing device displays one or more pie charts. The computing device receives an instruction to enter Threshold-Setting Mode. The computing device displays one or more threshold-setting flags associated with one or more pie chart slices and one or more indicators associated with the one or more pie chart slices. The computing device receives an instruction to set a threshold associated with a slice. The computing device updates a percentage displayed on an indicator associated with the threshold. The computing device displays the threshold as a virtual slice.

1 Claim, 5 Drawing Sheets

INTERACTIVE THRESHOLD SETTING FOR PIE CHARTS

TECHNICAL FIELD OF THE INVENTION

The present disclosure relates generally to the field of data analysis, and more particularly to generation of data visualizations for the purposes of monitoring and control.

BACKGROUND OF THE INVENTION

A goal of data visualization is the creation of visual representations of data, for example in the form of graphs, plots, and information graphics, which make data easier to understand and more useable for the viewer. Pie charts are data visualization tools that can convey information through slice color, position, and ratio. A pie chart is typically a circular (i.e., pie-shaped) chart comprising one or more sections, or "slices," each of which represents a defined percentage of the entire chart. The values represented by respective slices can be said to rely on each other, because together the values sum to 100 percent. In an example, a pie chart conveys information concerning the favorite colors reported by a class of 100 students and initially comprises a seventy-percent "green" slice (if seventy students report that their favorite color is green), a fifteen-percent "red" slice, a ten-percent "yellow" slice, a five-percent "blue" slice. In this example, if ten "green" students change their minds and report that blue is actually their favorite color, the "green" slice shrinks to fill sixty percent of the pie chart and the blue slice grows to fill fifteen percent of the pie chart.

A threshold is a value at or beyond which a measure (e.g., an intensity of a stimulus, a temperature, a percentage) becomes significant for a defined reason. For example, at or below thirty-two degrees Fahrenheit, water freezes; at or above 212 degrees Fahrenheit, water boils; and at or above a defined market share, a firm can be comfortable with its position.

SUMMARY

According to one embodiment of the present invention, a computer-implemented method for pie chart threshold-setting is provided. The method comprises providing, by one or more computer processors, one or more displayed pie charts comprising a plurality of pie chart slices; providing, by one or more computer processors, threshold-setting flags, wherein the threshold-setting flags comprise one or more range flags that can be controlled via a user interface to set a threshold, wherein the threshold is associated with a slice of the pie chart, and wherein the threshold-setting flags can be viewed and controlled by a user in a Threshold-Setting Mode; providing, by one or more computer processors, one or more indicators, wherein the one or more indicators display a percentage value associated with a respective threshold, and wherein the one or more indicators can be viewed in Threshold-Setting Mode; receiving, by one or more computer processors, an instruction to enter Threshold-Setting Mode; receiving, by one or more computer processors, an instruction to set a threshold, based on the user controlling a range flag or inputting a value via an indicator in Threshold-Setting Mode, wherein the user controls the range flag by a directional dragging motion, and wherein a lower threshold can be set by a leftwards dragging motion and an upper threshold can be set by a rightwards dragging motion; updating, by one or more computer processors, the displayed percentage value based on the set threshold; displaying, by one or more computer processors, the threshold as a virtual slice associated with the pie chart, wherein the virtual slice is displayed as an extension of the pie chart, wherein overlapping virtual slices associated with a plurality of pie chart slices are displayed based on the user having set at a plurality of thresholds, and wherein the multiple overlapping virtual slices are differentiated amongst themselves based on one or more of color and height; receiving, by one or more computer processors, an instruction to exit Threshold-Setting Mode; and hiding, by one or more computer processors, responsive to the instruction to exit Threshold-Setting Mode, the one or more threshold-setting flags and the one or more indicators.

DETAILED DESCRIPTION

A pie chart, as a data visualization tool, can communicate useful information through the color, position, and ratio of its slices. The usefulness of a pie chart can be enhanced by the addition of interactive elements such as threshold-setting capability, especially if the thresholds can be incorporated in such a way that they do not interfere with the overall clarity of the visualization. Achieving this kind of interactive, viewer-friendly threshold-setting capability can be challenging, because the slices of a pie chart represent percentages, and therefore they rely on each other. Embodiments described herein recognize this challenge and disclose an approach to threshold-setting for pie charts that can increase their usefulness for data monitoring and control purposes, such as but not limited to tracking disk space usage or tracking data usage on a mobile device while traveling.

Figure 1:
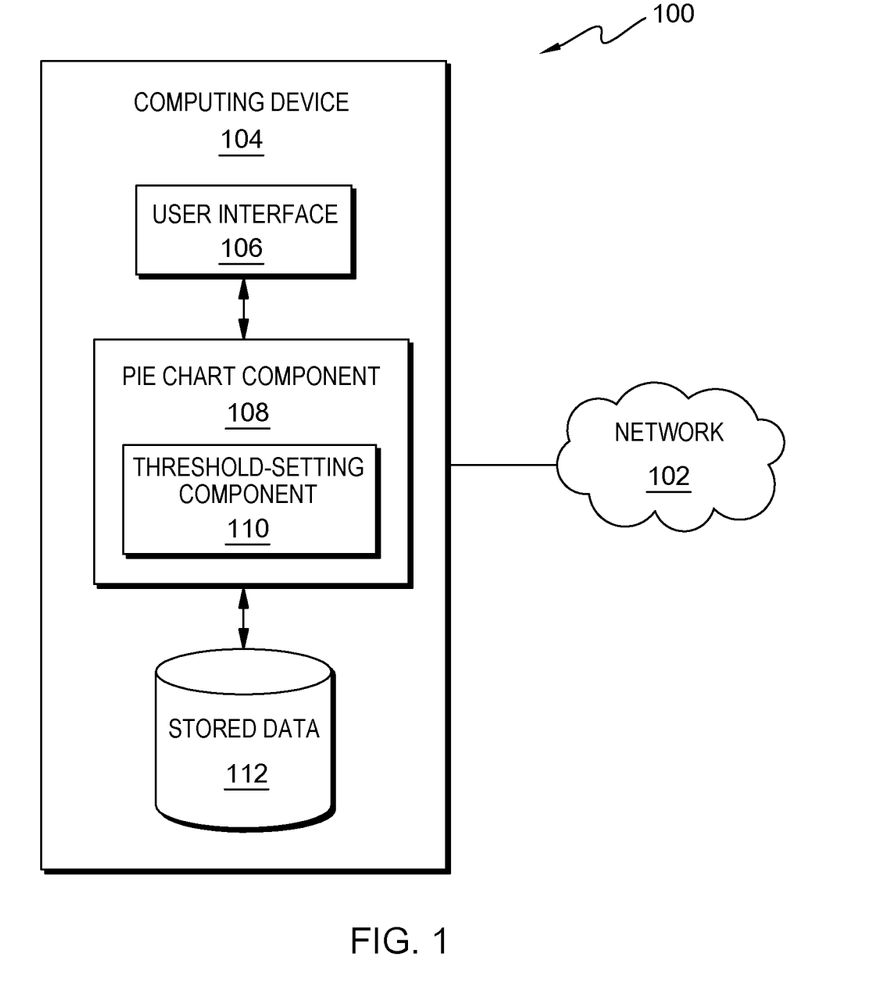
FIG. 1 is a block diagram of an exemplary computing environment, in accordance with an embodiment of the present invention.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes computing device 104, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between computing device 104 and other computing devices (not shown) within computing environment 100.

Computing device 104 can be any programmable electronic device capable of executing machine-readable instructions, communicating with other devices over network 102, and presenting information to a user via a user interface. Computing device 104 includes user interface 106, pie chart component 108, threshold-setting component 110, and stored data 112. Computing device 104 can include internal and external hardware components, as depicted and described in further detail with reference to FIG. 4.

User interface 106 provides an interface between a user of computing device 104 and computing device 104. User interface 106 can be, but is not limited to being, a graphical user interface (GUI) or a web user interface (WUI) and can display text, documents, web browser windows, user options, application interfaces, and instructions for operation, and can include the information (such as graphic, text, and sound) presented to a user and the control sequences the user employs to control threshold-setting component 110.

Pie chart component 108 is a program that generates pie chart-type data visualizations, or "pie charts," based on data, such as but not limited to real-time and/or stored data 112 (described herein). The pie charts can be, for example but without limitation, destined for display on a web page to meet monitoring and control objectives, such as but not limited to ensuring that a sales volume percentage for a geographic region does not fall below a defined threshold, and triggering an alert if the threshold is reached. Pie chart component 108 can display one or more generated pie charts to a user, as illustrated herein with reference to FIG. 3A-F.

Threshold-setting component 110 allows a user of pie chart component 108 to enter a "Threshold-Setting Mode" by, for example but without limitation, clicking or tapping with a finger or other touch object on a region of user interface 106 that is on or surrounding a displayed pie chart (not shown). In Threshold-Setting Mode, threshold-setting component 110 provides one or more threshold-setting cursors or flags, also referred to herein simply as "flags," corresponding to slices of the displayed pie chart.

The one or more threshold-setting flags corresponding to a specific slice comprise a range flag that the user can control to set a threshold associated with the slice. For example, for a pie chart that represents total available disk space and includes a slice that represents disk space used by a specific application, the user can control a range flag to set an upper threshold for permissible disk space usage by the application (e.g., as defined by the user).

The user can set an upper threshold by, for example but without limitation, using a finger or other touch object on a surface of a touchscreen display to drag the range flag rightwards (or clockwise) around the perimeter of the pie chart. An upper threshold is a virtual slice, as illustrated herein with reference to FIG. 3D-F, that represents a greater percentage of the entire pie chart than is represented by its corresponding slice. In an embodiment, the user can adjust (e.g., increase or decrease) the upper threshold by other interactions, such as a leftwards dragging motion to decrease the upper threshold or a rightwards dragging motion to increase the upper threshold. In another example, if a lower threshold is desired, the user can use a finger or other touch object to drag the range flag leftwards (or counterclockwise) around the perimeter of the pie chart. A lower threshold is a virtual slice, as illustrated herein with reference to FIG. 3B-E, that represents a smaller percentage of the entire pie chart than is represented by its corresponding slice. In an embodiment, the user can adjust (e.g., increase or decrease) the lower threshold by other interactions, such as a leftwards dragging motion to decrease the lower threshold or a rightwards dragging motion to increase the lower threshold.

In Threshold-Setting Mode, threshold-setting component 110 also provides one or more indicators corresponding to each slice of the displayed pie chart. An indicator shows information concerning the threshold, for example but without limitation, a percent value of the threshold and whether the threshold is an upper threshold or a lower threshold. The indicator can appear, e.g., near the slice to which it corresponds. The user can interact with the indicator to set a threshold without using a threshold-setting flag, as described herein with reference to FIG. 3F.

Stored data 112 comprises the data represented by the pie chart(s) generated by pie chart component 108 in a non-limiting embodiment. Stored data 112 can be stored entirely on computing device 104, or partly or entirely remotely, on other devices (not shown) within computing environment 100.

Figure 2:
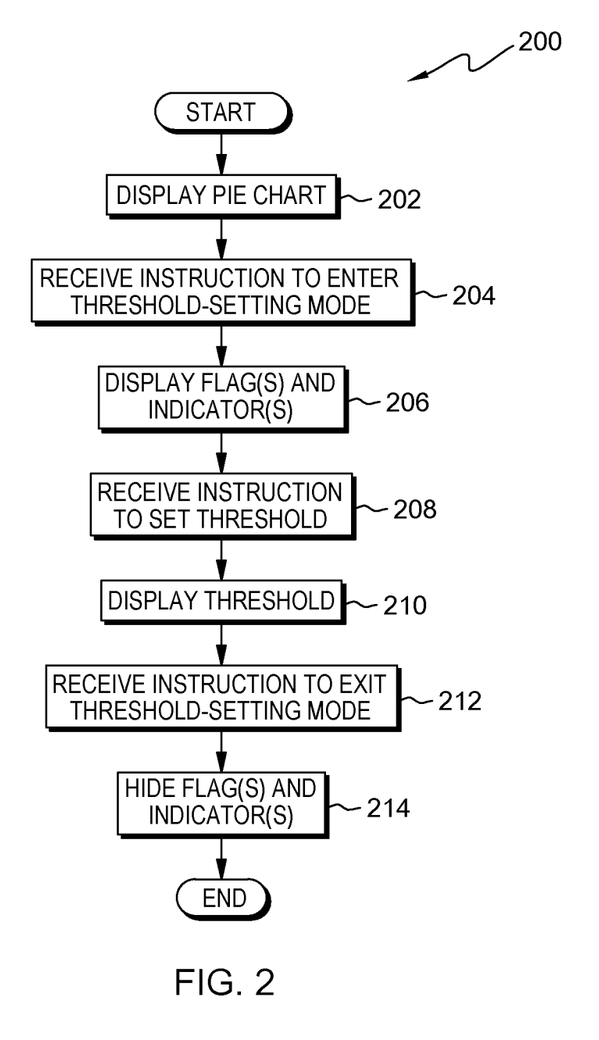
FIG. 2 is a flowchart depicting steps of a pie chart threshold-setting method, in accordance with an embodiment of the present invention.

FIG. 2 is a flowchart 200 depicting operational steps of a pie chart threshold-setting method, in accordance with an embodiment of the present invention.

In step 202, pie chart component 108 displays a pie chart via user interface 106.

In step 204, threshold-setting component 110 enters Threshold-Setting Mode responsive to, for example but without limitation, a user's click or tap interaction with a region on or surrounding the displayed pie chart.

In step 206, in Threshold-Setting Mode, threshold-setting component 110 provides one or more flags and an indicator corresponding to a slice of the pie chart.

In step 208, threshold-setting component 110 receives an instruction to set a threshold corresponding to the slice. In an example, the instruction can be in the form of a user input controlling a range flag, wherein the user clicks on and drags the range flag in a clockwise direction around the perimeter of the pie chart in order to set an upper threshold or adjust (increase) a lower threshold. In another example, the instruction can be in the form of a user input controlling the range flag, wherein the user clicks on and drags the range flag in a counterclockwise direction around the perimeter of the pie chart in order to set a lower threshold or adjust (decrease) a lower threshold. In another example, the instruction can be in the form of a user input via a displayed indicator, as described herein with reference to FIG. 3F.

In step 210, threshold-setting component 110 displays the set threshold as a virtual slice. Threshold-setting component 110 updates the indicator to show information, such as but not limited to a direction (upper or lower) and a percentage value, associated with the set threshold.

In step 212, threshold-setting component 110 receives an instruction to exit Threshold-Setting Mode.

In step 214, threshold-setting component 110 can hide the flag(s) and indicator corresponding to the slice. The virtual slice remains visible out of Threshold-Setting Mode.

FIG. 3A-F shows examples of a pie chart in Threshold-Setting Mode, in accordance with an embodiment of the present invention. It should be noted that the appearance of examples 300, 320, 330, 340, 350, and 360 can vary in different embodiments. For example but without limitation, the fill of a pie chart slice (e.g., the crosshatched fill of slice 308 in FIG. 3A) can vary (e.g., slice 308 can have a solid turquoise fill, without crosshatching, in another embodiment). Examples 300, 320, 340, 350, and 360 are intended to be non-limiting, and other possible variations will be appreciated by those skilled in the art.

Figure 3A:
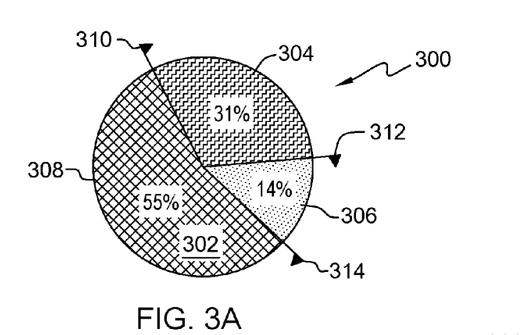
FIG. 3A-F shows examples of a pie chart in Threshold-Setting Mode, in accordance with an embodiment of present invention.

FIG. 3A shows example 300 of a pie chart in Threshold-Setting Mode. Example 300 shows pie chart 302 with slice 304, slice 306, and slice 308. Example 300 shows flag 310 associated with slice 304, flag 312 associated with slice 306, and flag 314 associated with slice 308. In an embodiment, flags 310-314 can be invisible when the user exits Threshold-Setting Mode (not shown), for example by clicking on a region on or near pie chart 302. Pie chart 302 can represent, for example but without limitation, respective market share percentages of three firms that sell widgets. In the same example, Firm A's market share (slice 304) is 31%, Firm B's market share (slice 306) is 14%, and Firm C's market share (slice 308) is 55%.

Figure 3B:
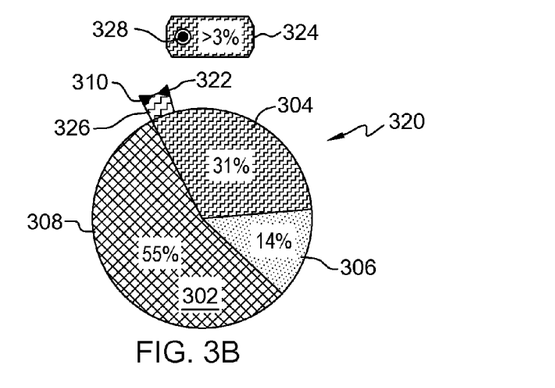

FIG. 3B shows example 320 of pie chart 302 when the user clicks on flag 310 in Threshold-Setting Mode. Responsive to the user clicking on flag 310, range flag 322, indicator 324, and threshold 326 appear. Range flag 322, indicator 324, and threshold 326 correspond to slice 304.

The user can click on and drag range flag 322 clockwise or counterclockwise along the perimeter of pie chart 302 in order to set threshold 326. Indicator 324 displays the percentage of pie chart 302 that is represented by threshold 326. In example 320, indicator 324 expresses threshold 326 as ">3%" (value 328), where the inequality (">," greater than) indicates that the user is setting an upper threshold.

Figure 3C:
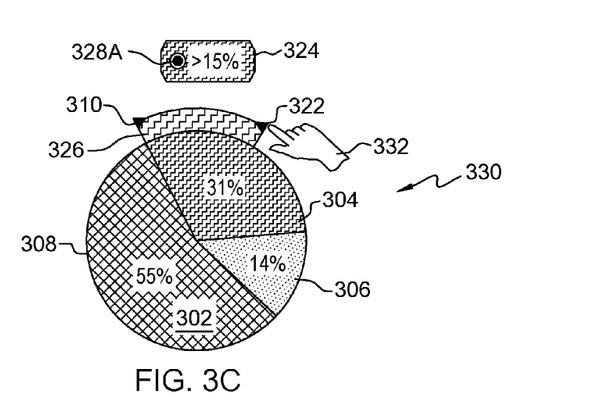

FIG. 3C shows example 330 of pie chart 302 with cursor 332, which in an embodiment can be a visible cursor displayed via user interface 106 or, for example but without limitation, in another embodiment represent (merely for the purpose of illustration) a finger or other touch object controlled by the user to drag range flag 322 clockwise along the perimeter of pie chart 302 in order to set an upper threshold. As shown in example 330, the appearance of slice 306 and slice 308, such as but without limitation the color saturation and/or fill density of the image, can change during dragging to allow the user to focus on slice 304 and threshold 326. As threshold 326 changes during dragging, indicator 324 shows an updated value 328A to reflect the change. The user can release range flag 322 (e.g., in the case of a touchscreen, lift his or her finger from the surface) to finish setting threshold 326.

Figures 3D, 3E:
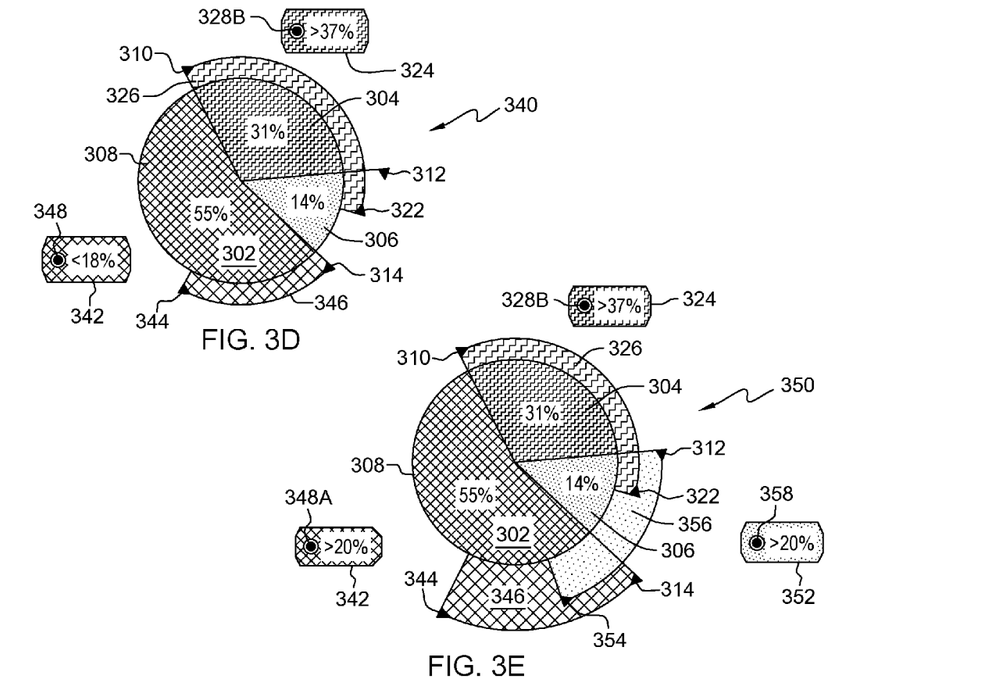

FIG. 3D shows example 340 of pie chart 302 when the user has set threshold 326 (at value 328B, >37%) and clicks on a second flag, i.e., flag 314, in Threshold-Setting Mode. Responsive to the user clicking on flag 314, indicator 342, range flag 344, and threshold 346 appear. Indicator 342, range flag 344, and threshold 346 correspond to slice 308.

The user can click on and drag range flag 344 clockwise or counterclockwise along the perimeter of pie chart 302 in order to adjust threshold 346. Indicator 342 displays the percentage of pie chart 302 that is represented by threshold 346. In example 340, indicator 342 expresses threshold 346 as "<18%" (value 348), wherein the inequality ("<," less than) indicates that the user is setting a lower threshold.

As shown in example 340, the respective colors and/or fill of indicator 324 and indicator 342, and of threshold 326 and threshold 346, can differ from each other and correspond to (e.g., match) the respective colors and/or fills of slice 304 and slice 308.

FIG. 3E shows example 350 of pie chart 302 when the user has set threshold 326 (at value 328B, >37%) and threshold 346 (at value 348A, >20%), and clicks on a third flag, i.e., flag 312, in Threshold-Setting Mode. Responsive to the user clicking on flag 312, indicator 352, range flag 354, and threshold 356 appear. Indicator 352, range flag 354, and threshold 356 correspond to slice 306.

The user can click on and drag range flag 354 clockwise or counterclockwise along the perimeter of pie chart 302 in order to adjust threshold 356. Indicator 352 displays the percentage of pie chart 302 that is represented by threshold 356. In example 350, indicator 352 expresses threshold 356 as ">20%" (value 358).

It should be noted that threshold 326, threshold 346, and threshold 356 can differ from one another in height as well as color and/or fill, in order to avoid viewer confusion due to multiple overlapping thresholds. For example, as shown in example 350, threshold 326, threshold 346, and threshold 356 can extend outward in a spiral pattern from pie chart 302.

Figure 3F:
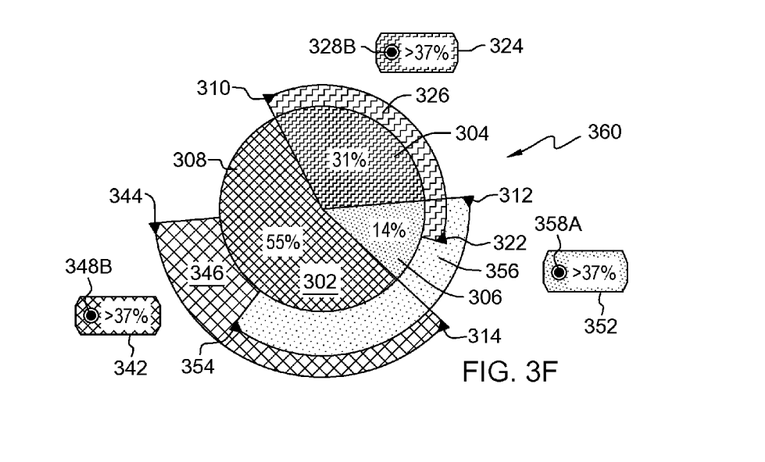

FIG. 3F shows example 360 of pie chart 302 when the user has adjusted threshold 346 (value 348B, >37%) and threshold 356 (value 358A, >37%) by another approach. For example, the user has clicked on indicator 342 and indicator 352, respectively, and input text (e.g., ">37%") to set thresholds 346-356 without controlling a range flags 344-354.

Figure 4:
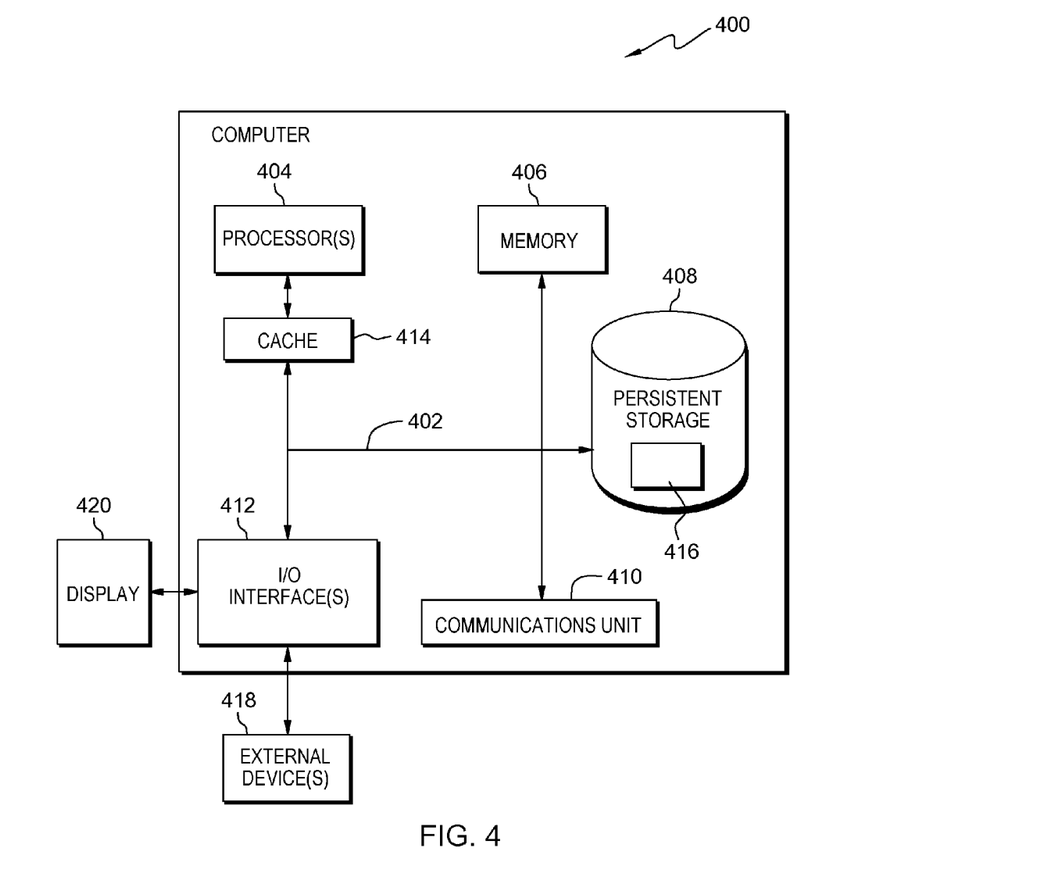
FIG. 4 is a block diagram of components of the computing device in FIG. 1 executing a pie chart threshold-setting program, in accordance with an embodiment of the present invention.

FIG. 4 depicts a block diagram 400 of components of computing device 104 in computing environment 100, in accordance with illustrative embodiments of the present invention. It should be appreciated that FIG. 4 provides only an illustration of one implementation and does not imply any limitations with regard to the environments in which different embodiments may be implemented. Many modifications to the depicted environment may be made.

Computing device 104 includes communications fabric 402, which provides communications between computer processor(s) 404, memory 406, persistent storage 408, communications unit 410, and input/output (I/O) interface(s) 412, and cache 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) and cache memory 414. In general, memory 406 can include any suitable volatile or non-volatile computer readable storage media. Cache 414 is a fast memory that enhances the performance of computer processor(s) 404 by holding recently accessed data, and data near accessed data, from memory 406.

Program instructions and data used to practice embodiments of the invention, referred to collectively as component(s) 416, are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. Communications unit 410 can include one or more network interface cards. Communications unit 410 can provide communications through the use of either or both physical and wireless communications links. Component(s) 416 can be downloaded to persistent storage 408 through communications unit 410.

I/O interface(s) 412 allows for input and output of data with other devices that may be connected to computing device 104. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., component(s) 416, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for pie chart threshold setting, the method comprising:

providing, by one or more computer processors, one or more displayed pie charts comprising a plurality of pie chart slices;

providing, by the one or more computer processors, threshold-setting flags, wherein the threshold-setting flags comprise one or more range flags that can be controlled via a user interface to set a threshold, wherein the threshold is associated with a slice of the pie chart, and wherein the threshold-setting flags can be viewed and controlled by a user in a Threshold-Setting Mode;

providing, by the one or more computer processors, one or more indicators, wherein the one or more indicators display a percentage value associated with a respective threshold, and wherein the one or more indicators can be viewed in the Threshold-Setting Mode;

receiving, by the one or more computer processors, an instruction to enter the Threshold-Setting Mode;

receiving, by the one or more computer processors, an instruction to set the threshold, based on the user controlling a range flag of the one or more range flags or inputting a value via an indicator of the one or more indicators in the Threshold-Setting Mode, wherein the user controls the range flag by a directional dragging motion, and wherein a lower threshold can be set by a leftwards dragging motion or an upper threshold can be set by a rightwards dragging motion;

updating, by the one or more computer processors, the displayed percentage value based on the set threshold;

displaying, by the one or more computer processors, at a display device, the set threshold as a virtual slice associated with the pie chart, wherein the virtual slice is displayed as an extension of the pie chart, wherein overlapping virtual slices associated with a plurality of pie chart slices are displayed based on the user having set at a plurality of thresholds, and wherein the multiple overlapping virtual slices are differentiated amongst themselves based on one or more of color and height;

receiving, by the one or more computer processors, an instruction to exit the Threshold-Setting Mode; and hiding, by the one or more computer processors, responsive to the instruction to exit the Threshold-Setting Mode, the one or more threshold-setting flags and the one or more indicators.

* * * * *